United States Patent [19]
Itoh et al.

[11] Patent Number: 5,559,935
[45] Date of Patent: Sep. 24, 1996

[54] METHOD AND APPARATUS FOR GENERATING ISOSURFACES

[75] Inventors: Takayuki Itoh, Sagamihara; Koji Koyamada, Hadano, both of Japan

[73] Assignee: International Business Machines Corporation, Armonk, N.Y.

[21] Appl. No.: 347,014

[22] Filed: Nov. 30, 1994

[30] Foreign Application Priority Data

Dec. 16, 1993 [JP] Japan ................................. 5-316747

[51] Int. Cl.$^6$ .................................................. G06T 17/20
[52] U.S. Cl. ........................................................... 395/124
[58] Field of Search ................................... 395/118, 119, 395/124

[56] References Cited

PUBLICATIONS

Koyamada, "Visualization of Simulated Airflow in a Clean Room", IEEE Visualization '92, pp. 156–163 (1992).
Gallagher, "Span Filtering: An Optimization Scheme for Volume Visualization of Large Finite Element Models", IEEE Proceedings Visualization '91, pp. 68–74, Oct. 1991.
"An Isosurface Generation Tool with Position Being a Parameter" 47th Natl Assembly of the Information Processing Soc. of Japan, 4R–8 1993.
"Marching Cubes: A High Resolution 3D Surface Construction Algorithm" W. L. Lorensen et al Computor Graphics V 21 #4 Jul./1987 pp. 163–169.

"An Efficient Method of Triangulating Equi–Valued Surfaces by Using Tetrahedral Cells" Doi et al IEICE Trans. vol. E74 #1 Jan./1991 pp. 214–224.
"Volume Probes: Interactive Data Exploration on Arbitrary Grids" D. Speray et al Computer Graphics vol. 24 #5 Nov./1990 pp. 5–12.
"Visualization of Simulated Airflow in a Clean Room" K. Koyamada IEEE Computer Society –Proc. Visualization 1992 pp. 156–163.

*Primary Examiner*—Almis R. Jankus
*Assistant Examiner*—Rudolph J. Buchel
*Attorney, Agent, or Firm*—Jay P. Sbrollini

[57] ABSTRACT

An isosurface is composed of grid points having a predetermined scalar value. The method and apparatus of the present invention generates an isosurface by extracting from volume data a first grid point having a minimum scalar value and a second grid point having a maximum scalar value. A list of polyhedrons that intersect a line connecting the first grid point to the second grid point is generated and stored. The isosurface is generated in accordance with the list of polyhedrons and the predetermined scalar value. Because the volume data obtained by scientific and technological calculation or the like is kept in the form of a polyhedron list having an associated maximum scalar value and minimum scalar value, generating an isosurface according to a predetermined scalar value can be accomplished at high speed.

18 Claims, 14 Drawing Sheets

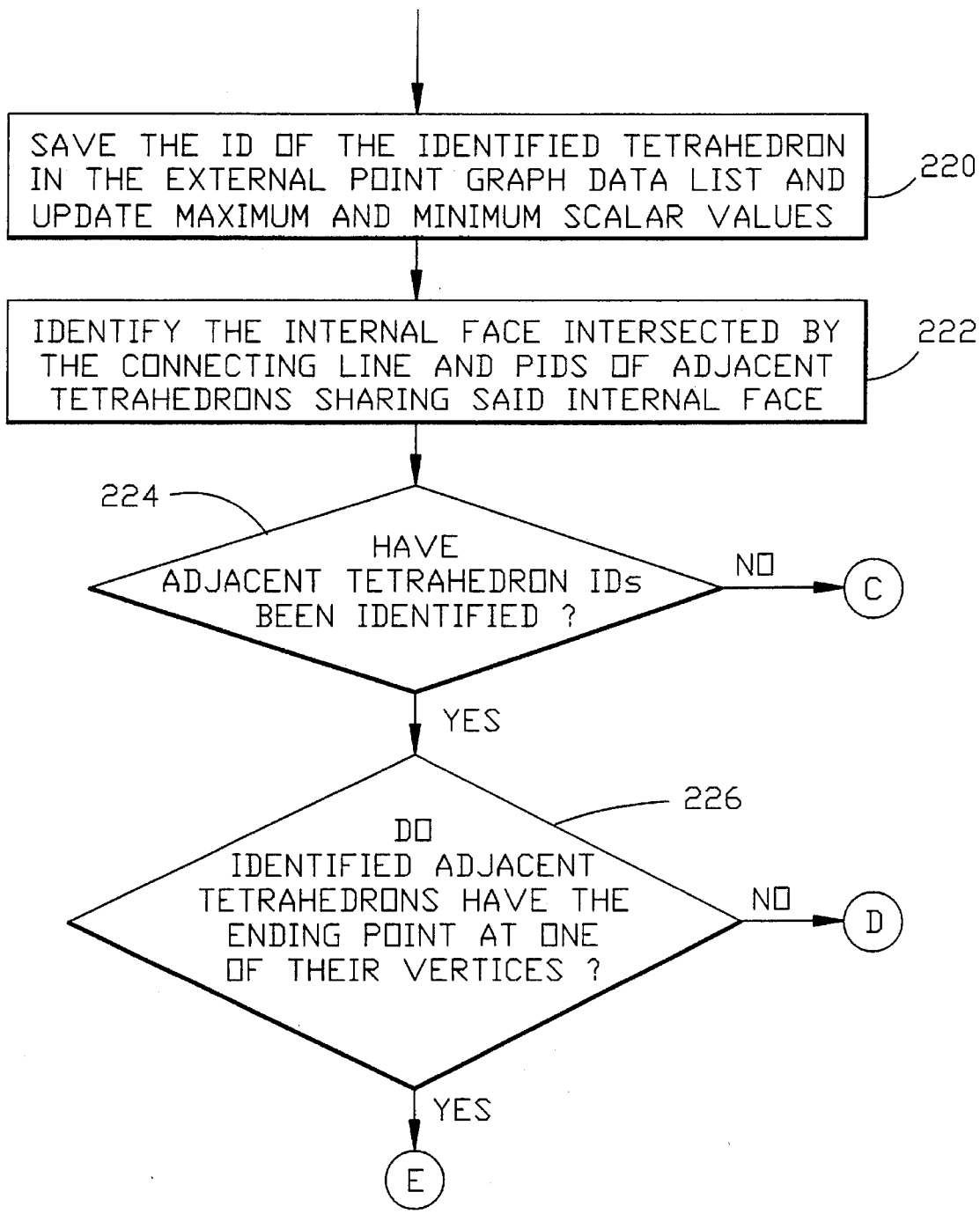

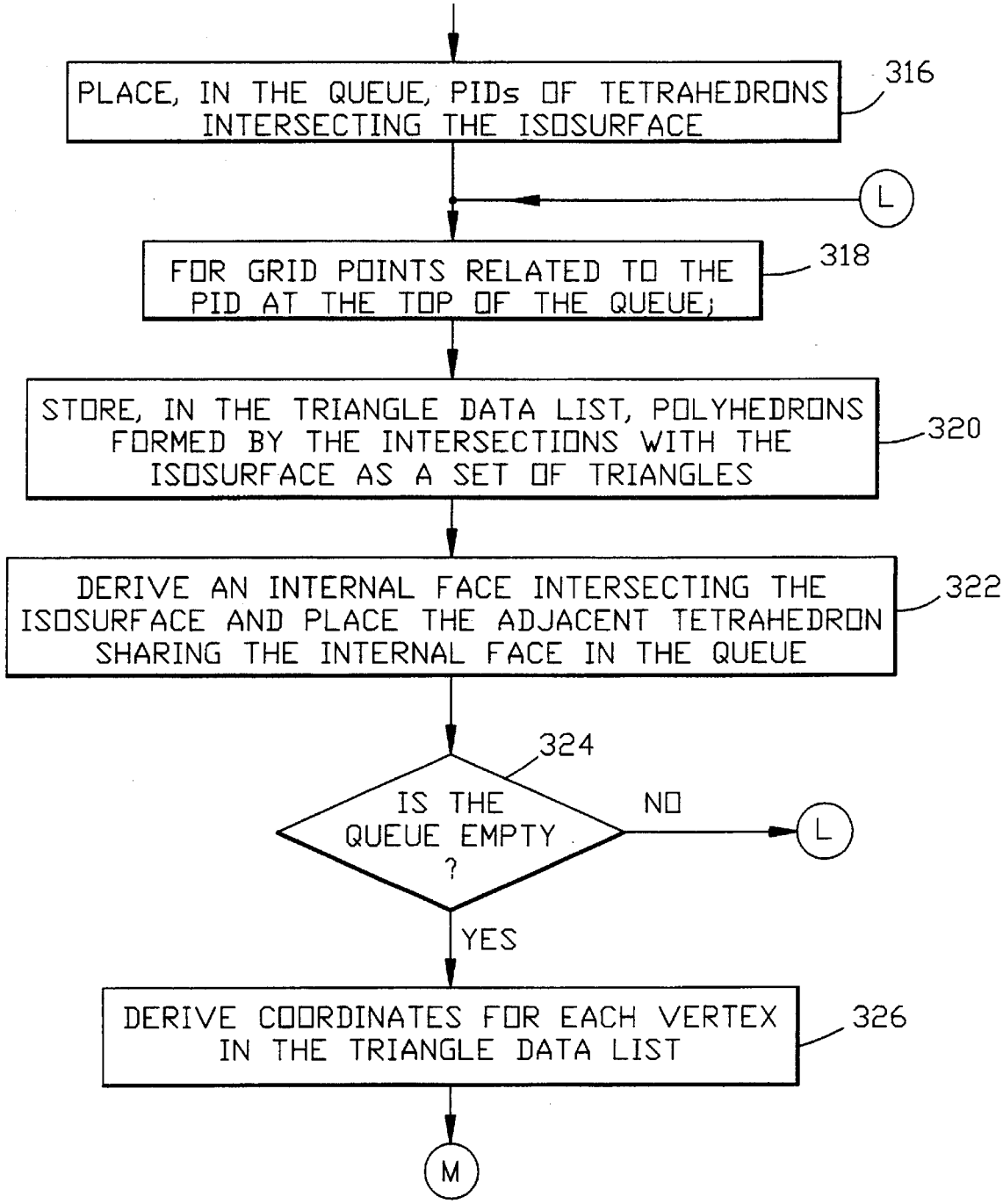

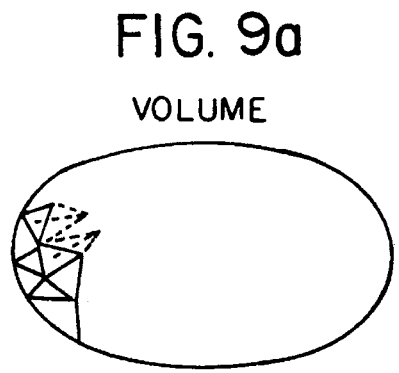
FIG. 9a
VOLUME
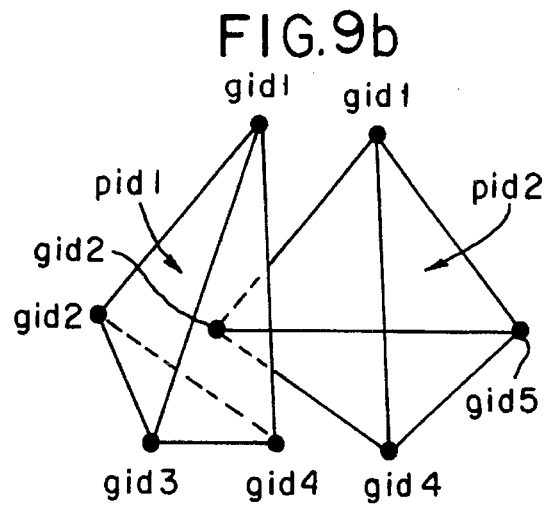
FIG. 9b
FIG. 9c
| PID | GID | ADJACENT TETRAHEDRON (PID) | |
|---|---|---|---|
| pid1 | gid1, gid2, gid3, gid4 | pid2 | ... |
| pid2 | gid1, gid2, gid4, gid5 | pid2 | ... |
| pid3 | ...... | ...... | |
| ⋮ | ⋮ | ⋮ | |
FIG. 9d
| GID | COORDINATES OF GRID POINTS | SCALAR VALUE [°C] |
|---|---|---|
| gid1 | (1.0, 0.0, 0.0) | 20.5 |
| gid2 | (1.0, 1.0, 1.0) | 22.3 |
| ⋮ | ⋮ | ⋮ |
FIG. 9e
| BOUNDARY SURFACE ID | GID | SURFACE ID |
|---|---|---|
| 1 | 7 | 2 |
| ⋮ | ⋮ | ⋮ |

FIG.11a
| EPID | GID | CONNECTION FLAG VALUE |
|------|------|------|
| ep1 | gid1 | gid1 |
| ep2 | gid7 | gid7 |
| ep3 | gid10 | gid10 |
| ⋮ | ⋮ | ⋮ |
FIG.11b
| EPID | GID | CONNECTION FLAG VALUE |
|------|------|------|
| ep1 | gid1 | gid1 |
| ep2 | gid7 | gid1 |
| ep3 | gid10 | gid1 |
| ⋮ | ⋮ | ⋮ |
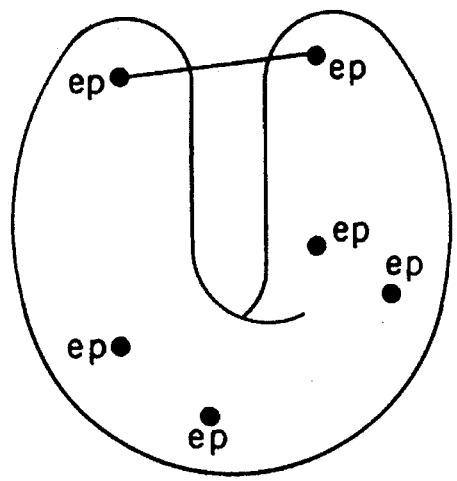
FIG. 12a
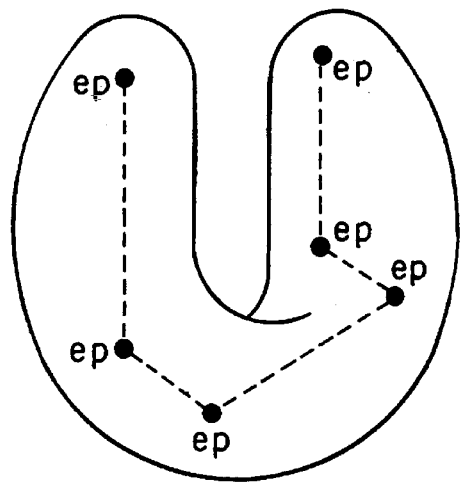
FIG. 12b

FIG.13

| CLID | BOTH END POINTS (GID) | MAXIMUM SCALAR VALUE (Smax) | MINIMUM SCALAR VALUE (Smin) | INTERSECTED TETRAHEDRONS (PID) | INTERSECTED TETRAHEDRONS |
|---|---|---|---|---|---|
| 1 | gid1, gid2 | 28.5 | 20.5 | ... | 10 |
| 2 | gid3, gid2 | 26.0 | 20.5 | ... | 7 |
| 3 | gid4, gid2 | 22.0 | 20.5 | ... | 12 |
| 4 | gid5, gid2 | 20.5 | 17.0 | ... | 11 |
| ... | | | | | |

FIG.14b

| VERTICES (GID) | COORDINATES OF VERTICES [°C] | SCALAR VALUE |
|---|---|---|
| gid1 | (1.0, 0.0, 0.0) | 20.5 |
| gid2 | (2.0, 1.0, 0.0) | 19.5 |
| gid3 | | ... |
| gid4 | | ... |
| ... | | |

FIG.14a

| TRIANGLE (TID) | VERTEX (GID) |
|---|---|
| t1 | gid1, gid2, gid3 |
| t2 | gid2, gid3, gid4 |
| t3 | gid1, gid3, gid5 |
| t4 | gid3, gid5, gid6 |
| ... | |

FIG. 15a
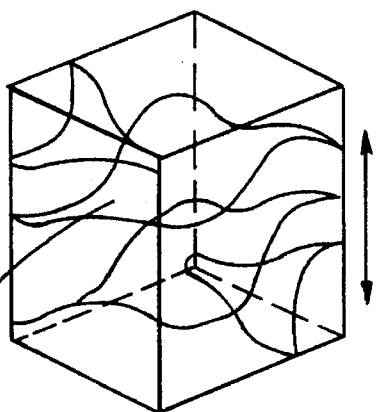
<isosurfaces>
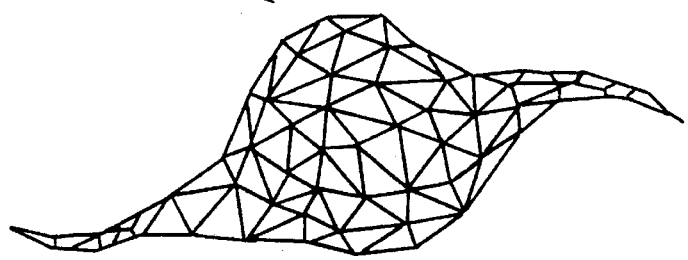
FIG. 15b
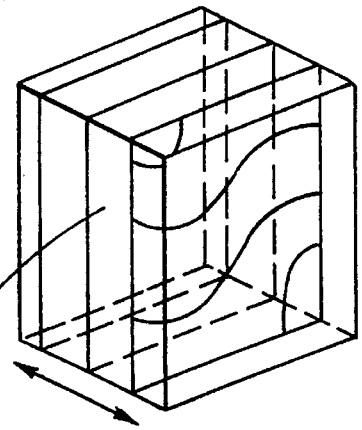
<slice surfaces>
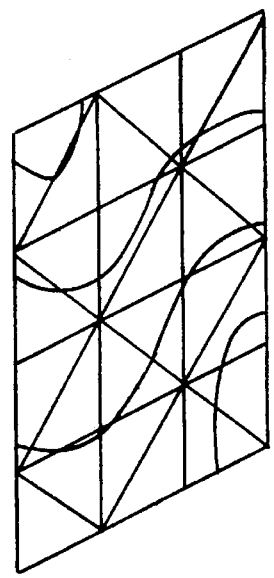

METHOD AND APPARATUS FOR GENERATING ISOSURFACES

BACKGROUND OF THE INVENTION

1. Technical Field

This invention relates to methods and devices that visualize three-dimensional graphics data, and, more particularly, to a method and apparatus for generating at high speed an isosurface from three-dimensional scalar data of an object body.

2. Description of the Prior Art

Scientific and technological calculation for three-dimensional object bodies (volumes) has an increasing area of application, such as medical measurement by a CT scanner and the numerical analysis of temperature and stress distribution encountered in the design of a personal computer enclosure. Typically, the three-dimensional object body is represented by volume data consisting of a set of multiple grid points. Each of the grid points has an associated scalar value determined by calculation. Accordingly, we must discuss the problem of representing at high speed the resulting three-dimensional scalar field on a display.

One representation technique for such three-dimensional scalar fields implements isosurfaces, which are surfaces composed of a set of points having the same scalar value. Representation by isosurfaces may be said to be an effective technique for representing three-dimensional scalar fields at high speed.

Existing techniques for generating isosurfaces include, for example, the following:

(1) representation by polygon approximation;
(2) representation by self-proliferating generation.

Representation by Polygon Approximation

As described above, a three-dimensional object is represented by volume data consisting of a set of grid points. Each of the grid points has an associated scalar value determined by calculation. A fixed number of grid points can be associated with one another to form a polyhedron, which is a combination of polygons (for example, a tetrahedron). Thus, the volume data constitute a set of tetrahedrons.

If, for example, a user specifies a given scalar value associated with an isosurface, it can be assumed that a tetrahedron in the volume data includes grid points having both scalar values greater and less than the specified scalar value. Because the scalar values usually vary continuously over the volume data, it is, as a matter of fact, obvious that the tetrahedron intersects the specified isosurface.

The "representation by polygon approximation" technique is based upon this obvious fact. It is a technique to extract polyhedrons intersected by an isosurface by sequential determination of the relative magnitude of each grid point the volume data as compared to the specified scalar value. The isosurface is then represented as a set of these extracted polyhedrons.

This technique is disclosed in detail in "Marching Cubes: A High-Resolution 3D Surface Construction Algorithm" (Computer Graphics, Vol. 21, No. 4, pp. 163–169, 1987) by Lorensen et al. and "An Efficient Method of Triangulating Equivalued Surfaces by Using Tetrahedral Cells" (IEICE Transactions, Vol. E74, No. 1, pp. 214–224, 1991) by Doi et al. and others.

In most general cases, however, the isosurface intersects very few grid points in volume data. This technique involves unnecessary decision-making on grid points other than those intersected by the isosurface and results in a waste of processing time.

Representation By Self-Proliferating Generation

As stated above, it is obvious that the line connecting grid points having values greater than and less than the scalar value specified for an isosurface intersects that isosurface. It may be easily inferred that there exist among the polyhedrons adjacent to the polyhedron containing a combination of grid points that intersect the isosurface, polyhedrons which intersect the isosurface.

Therefore, by first extracting a polyhedron which intersect an isosurface, then repeatedly determining the relative magnitude, of grid points composing adjacent polyhedrons in comparison with a specified scalar value of the isosurface it is possible to extract, all combinations of grid points intersected by the isosurface in a self-proliferating manner. This is the outline of "self-proliferating generation."

This technique eliminates the need for making a decision on grid points not intersecting the isosurface as in the case of "representation by polygon approximation" and, therefore, allows the isosurface to be generated at a higher speed.

This technique is disclosed in detail in "Volume Probe: Interactive Data Exploration on Arbitrary Grids" (Computer Graphics, Vol. 24, No. 5, pp. 5–12, 1990) by Spaley et al. and others. One example of volume data structure to implement this technique is disclosed in "visualization of Simulated Airflow in a Clean Room" (IEEE Visualization '92, pp. 156–163, 1992) by Koyamada. A technique to make this self-proliferation faster is disclosed in "An Isosurface Generation Tool with Position Being a Parameter" (47th National Assembly of the Information Processing Society of Japan, 4R-8, 1993).

In this technique, however, the user must manually specify the first combination of grid points that is the starting point for the repetitive processing. For a scalar field with a complex distribution, this would impose complicated operations on the user because multiple, separate isosurfaces may be generated for one scalar value. Spaley et al., cited above, applied this technique to a sliced surface with little likelihood of separation; that is: a special case of an isosurface. Moreover, this technique cannot be directly applied to existing display applications in which multiple scalar values are automatically specified in succession and multiple isosurfaces are animatedly displayed.

It is therefore an object of the present invention to provide an improved visualized data generation method and apparatus capable of generating an isosurface at high speed.

It is a further object of the present invention to provide a visualized data generation method and apparatus capable of automatically generating a desired isosurface from volume data without undue problems to the user.

A still further object of the invention is to provide a visualized data generation method and apparatus capable of animated display of isosurfaces without relying on successive, interactive generation of isosurfaces.

SUMMARY OF THE INVENTION

To achieve the objects in accordance with the purposes of the present invention, as embodied and described herein, a method for generating an isosurface composed of grid points having a predetermined scalar value comprises the steps of extracting from volume data a first grid point having a first extremal scalar value; extracting from the volume data a second grid point having a second extremal scalar value; generating and storing a list of polyhedrons that intersect a line connecting the first grid point to the second grid point; and generating the isosurface in accordance with the list of polyhedrons and the predetermined scalar value.

The corresponding apparatus for generating an isosurface constituting grid points having a predetermined scalar value comprises a first extractor for extracting from volume data a first grid point having a first extremal scalar value; a second extractor for extracting from the volume data a second grid point having a second extremal scalar value; a polyhedron list generator for generating a list of polyhedrons that intersect a line connecting the first grid point to the second grid point; a memory for storing the list generated by the polyhedron list generator; and an isosurface generator for generating the isosurface according to the list of polyhedrons stored in the memory and the predetermined scalar value.

Because the volume data obtained by scientific and technological calculation or the like is kept in the form of polyhedron list having an associated maximum scalar value and minimum scalar value, generating an isosurface according to a predetermined scalar value can be accomplished at high speed.

It is then possible to draw visualized data desired by the user on an installed display unit based upon generated isosurface data.

BRIEF DESCRIPTION OF THE DRAWINGS

FIG. 8 is a flow chart showing another part of the algorithm executed by the isosurface generation subsystem (16) of the visualized data generation system (100) according to this invention;

FIG. 9 is charts that describe the structure of volume data used in an embodiment of this invention and, in detail, FIGS. 9 (a) and (b) show an outline of a volume, FIG. 9 (c) shows the data structure of a tetrahedron list, FIG. 9 (d) shows the data structure of a grid point data list, and FIG. 9 (e) shows the data structure of a boundary surface data list;

FIGS. 11(a) and (b) are charts that describe the structure of an extremal point data list used in an embodiment of this invention;

FIGS. 12(a) and (b) are graphs showing the effect of an embodiment of this invention and, in more detail, contains a conceptual drawing to describe the case where the connecting line connecting extremal points runs out of the domain of a volume;

FIG. 13 is a chart that describes the structure of an extremal point graph data list used in an embodiment of this invention;

FIG. 14 is charts that describe the structure of isosurface data used in an embodiment of this invention and, in detail, FIG. 14 (a) shows the structure of a triangle data list and FIG. 14 (b) shows the structure of a vertex data list; and FIG. 15 is drawings that describe the effect of this invention and the operation of a visualized data generation system in an embodiment of this invention and, in detail, FIG. 15 (a) shows an isosurface generated by specifying a scalar value and FIG. 15(b) shows a slice surface generated by specifying coordinates of the slice surface.

DESCRIPTION OF THE PREFERRED EMBODIMENTS

Figure 1:
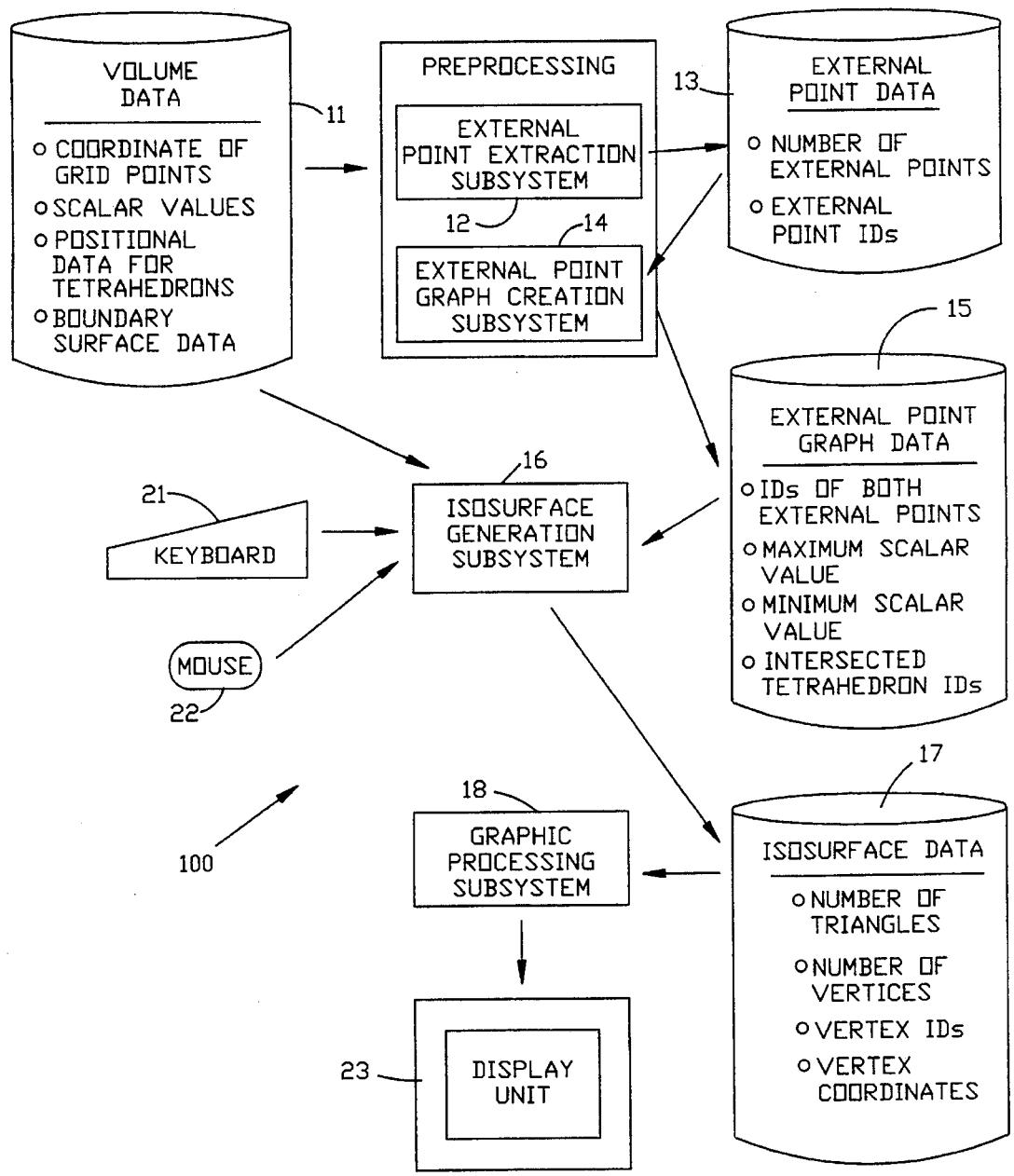
FIG. 1 is a diagram showing a configuration of the visualized data generation system (100) according to this invention.

FIG. 1 shows a conceptual configuration of a visualized data generation system (100) and its peripherals to implement the present invention. This system may be divided, by function, into an extremal point extraction subsystem (12), extremal point graph creation subsystem (14), isosurface generation subsystem (16), graphic processing subsystem (18), volume data storage (11) to store input/output information for these subsystems (12 ff.), extremal point data storage device (13), extremal point graph data storage device (15), and isosurface data storage device (17). In this embodiment, individual storage blocks are set up to store different types of data. This is, however, for convenience in description; address space in the same memory may be assigned for different type of data. The system (100) is equipped with a keyboard (21) and mouse (22) to enter numerical values, coordinates, text, and the like by the user and a display unit (23) to display visualized information. These components are described separately below.

(1) Volume data storage (11)

As described in the "Description of the Prior Art" above, three-dimensional scalar data, such as temperature and stress distribution inside an object body (for example, the enclosure of a personal computer) derived by scientific and technological calculation, may be represented in the form of volume data that indicates a scalar value (temperature, stress, and the like) for each of the vertices (grid points) of numerous polyhedrons (tetrahedrons in this embodiment for convenience of description) derived by dividing up the object body.

A description is given here of the data structure of volume data used in this embodiment. Consider, for example, that the object body, namely, the volume shown in FIG. 9 (a), consists of numerous tetrahedrons; and as shown in FIG. 9 (b), each tetrahedron is given a polygon identifier (PID) and each grid point is given a grid identifier (GID). The volume data contains a tetrahedron list, grid point data list, and boundary surface data list. In the tetrahedron list, one entry is provided for each of the tetrahedrons comprising the volume and, in each entry, fields are provided to store GIDs of the four grid points composing the tetrahedron corresponding to a PID and PIDs of tetrahedrons adjacent to this tetrahedron, namely, APIDs. FIG. 9 (c) shows an example of the structure of a tetrahedron list. In the grid point data list, entries are provided separately for each grid point in the volume and, in each entry, fields are provided to store positional information for the grid point corresponding to a GID, the scalar value at that grid point being a result of scientific and technological calculation, a "non-maximum" flag, and a "non-minimum" flag (the information held by "non-maximum" and "non-minimum" flags will be described below). FIG. 9 (d) shows an example, the structure of a grid point data list. The boundary surface data list enumerates, among tetrahedrons composing the volume, those forming the boundary surface of the volume. FIG. 9 (e) shows, an example of the structure of a boundary surface data list.

The structure of the volume data (i.e., consisting of three data lists) is employed here for convenience of description of the embodiment; however, the present invention is not limited in this respect.

(2) Extremal point extraction subsystem (12)

The extremal point extraction subsystem (12) extracts from the volume data, grid points holding a minimum and maximum scalar value and stores the results in the extremal point data storage (13). The data structure of the extremal point data storage is described below.

Figure 10A:
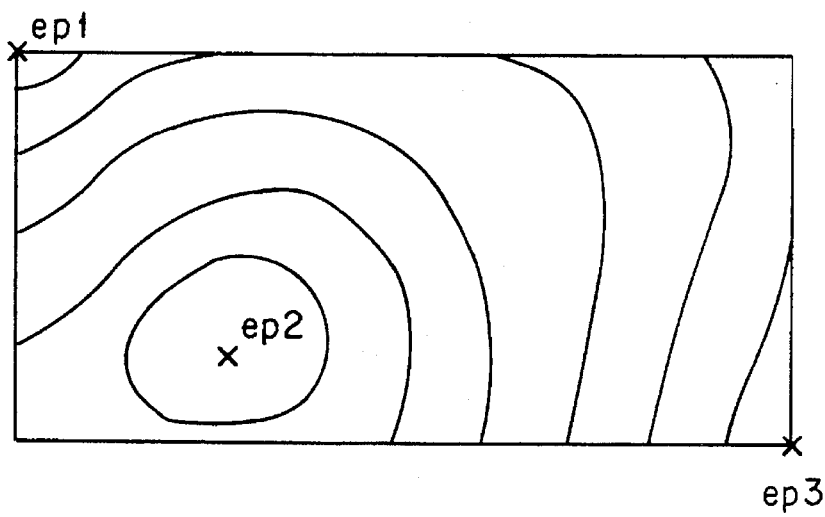
FIG. 10 is charts that describe the effect of an embodiment of this invention and, in detail, FIG. 10 (a) shows the process of extraction, by the extremal point extraction subsystem (12), grid points having an extremal scalar value, FIG. 10 (b) shows the process of extraction, by the extremal point graph creation subsystem (14), information about connecting lines connecting extremal points, and FIG. 10 (c) shows the process of extraction, by the isosurface generation subsystem (16) to scan connecting lines, graphic information necessary to generate isosurfaces.
Figure 10B:
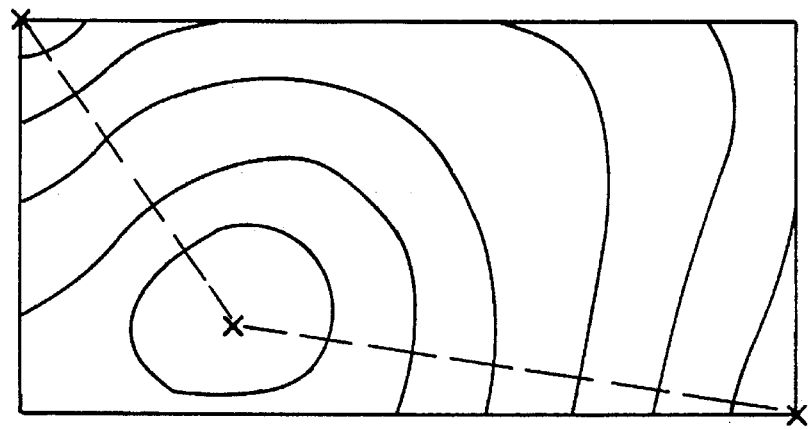
Figure 10C:
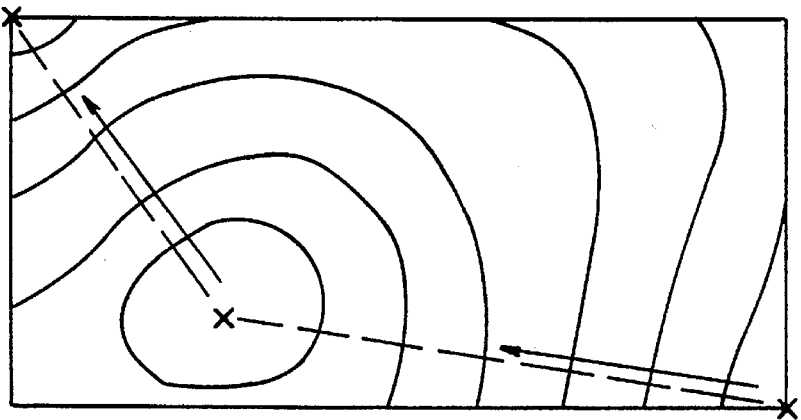

Assume, for example, that data of an arbitrary slice surface is represented as shown in FIG. 10 (a). In this figure, each curve is formed by connecting points with the same scalar value, and a surface composed of such equivalent curves is called an isosurface. In this figure, points ep1, ep2, and ep3 are extremal scalar points (namely, maximum or minimum scalar points) present in the slice surface and can be extracted from the volume data by the extremal point extraction subsystem (12).

Figure 2:
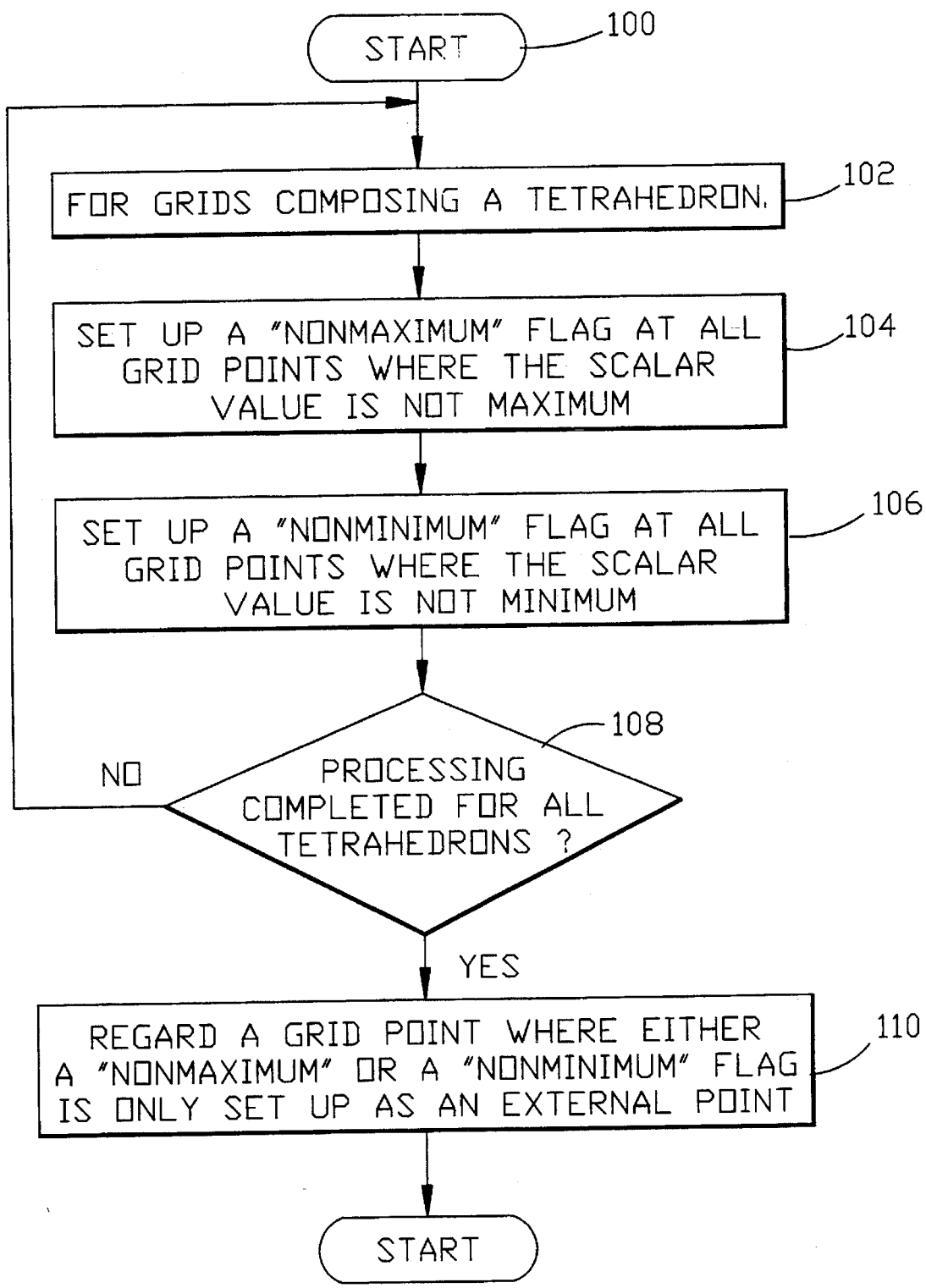
FIG. 2 is a flow chart showing the algorithm executed by the extremal point extraction subsystem (12) of the visualized data generation system (100) according to this invention.
Figure 3:
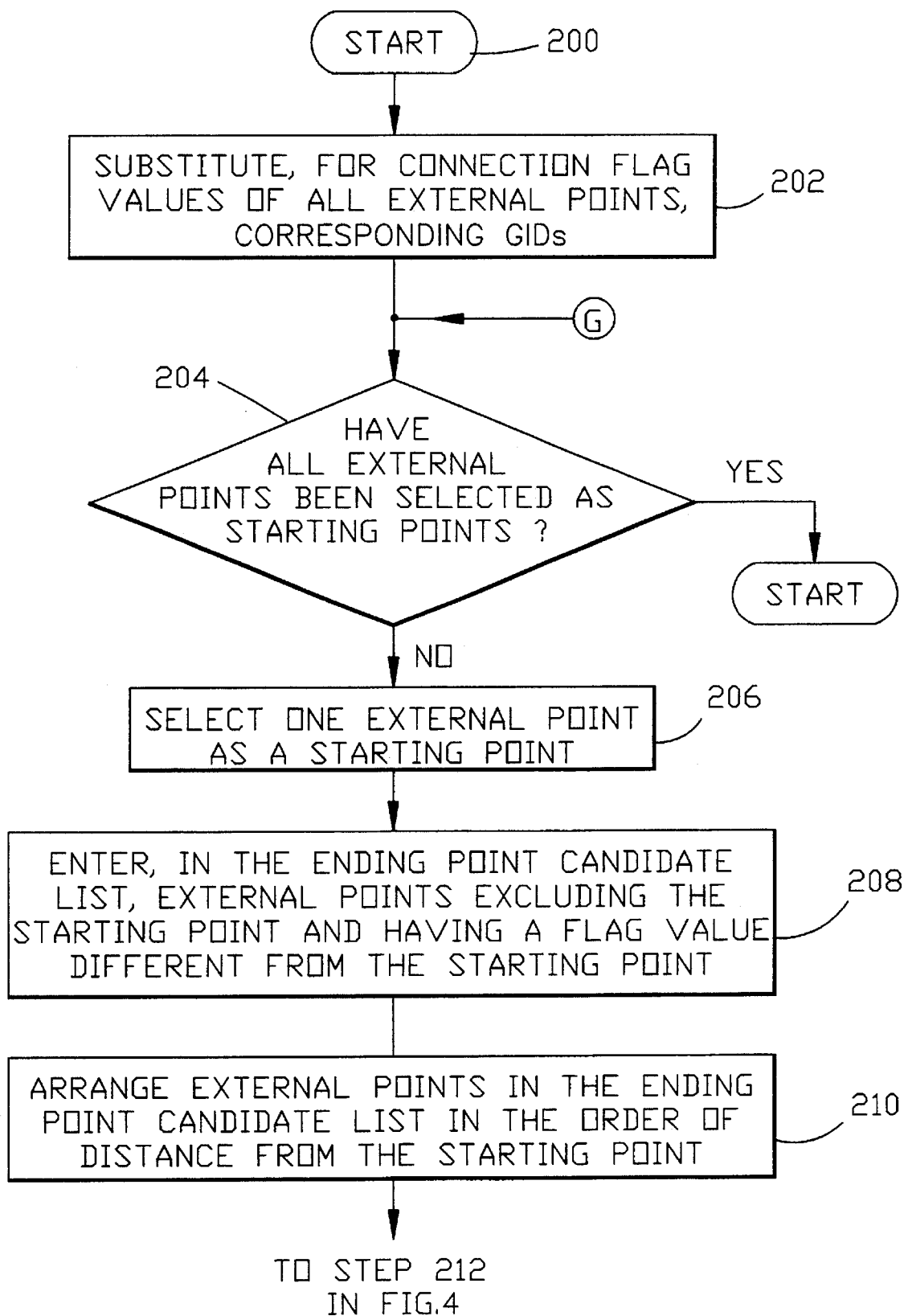
FIG. 3 is a flow chart showing part of the algorithm executed by the extremal point graph creation subsystem (14) of the visualized data generation system (100) according to this invention.
Figures 4, 4A:
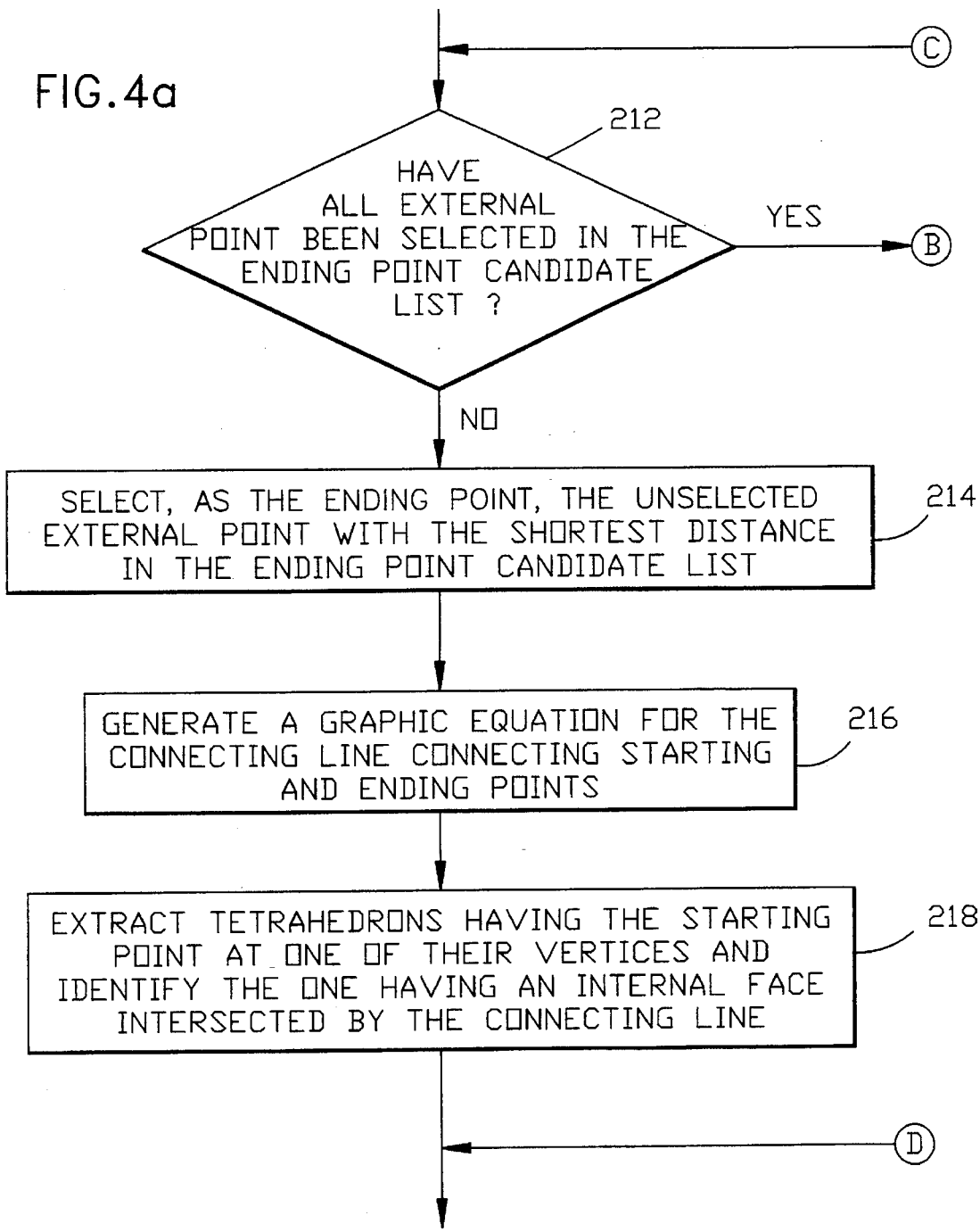
FIGS. 4(a) and (b) are a flow chart showing another part of the algorithm executed by the extremal point graph creation subsystem (14) of the visualized data generation system (100) according to this invention.
Figure 5:
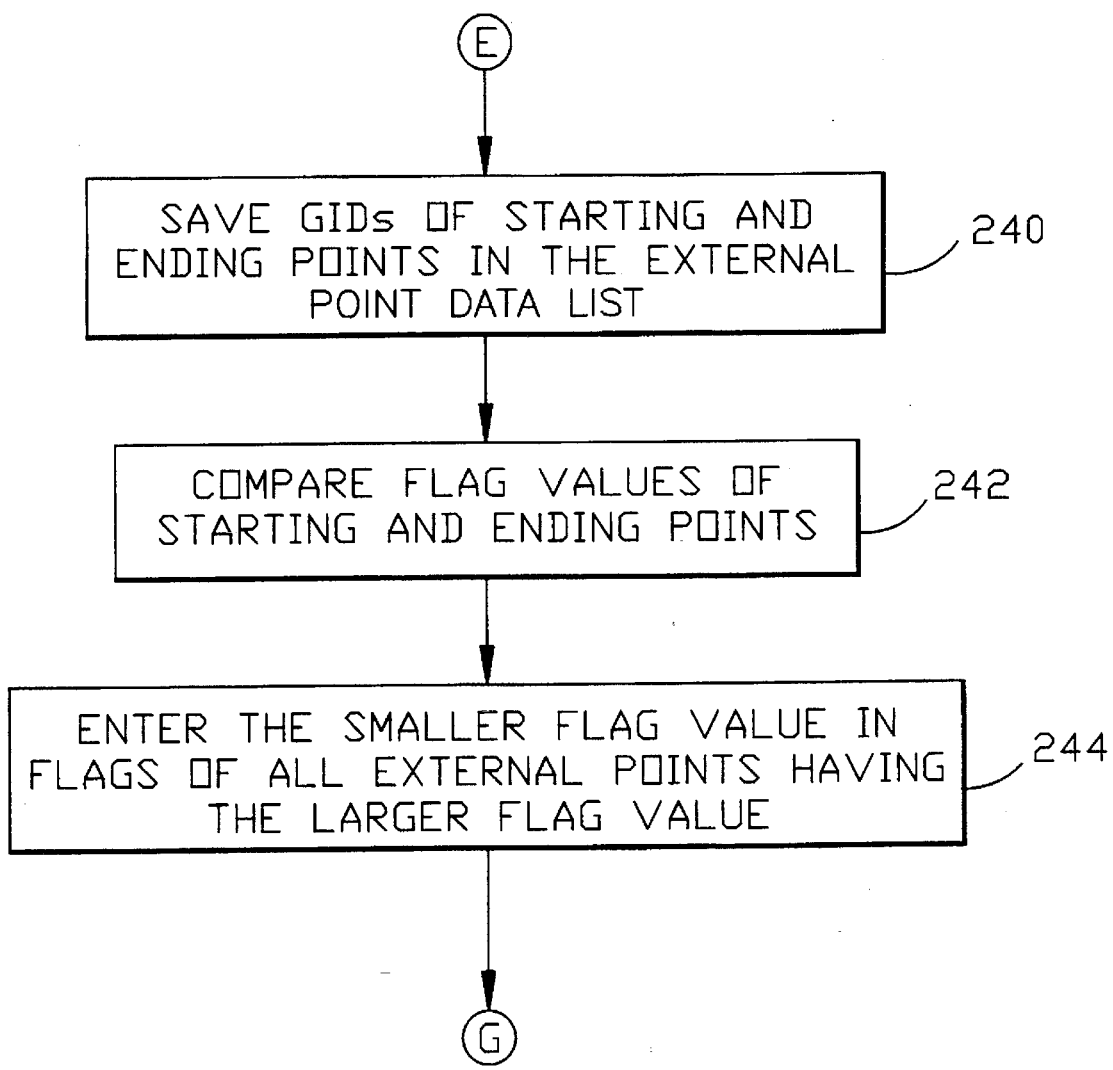
FIG. 5 is a flow chart showing still another part of the algorithm executed by the extremal point graph creation subsystem (14) of the visualized data generation system (100) according to this invention.

The algorithm used in the extremal point extraction subsystem (12) to search for extremal points is as shown in FIG. 2. The algorithm starts at step 100. The closed loop consisting of steps 102, 104, 106, and 108 is sequentially repeated from the top entry in the tetrahedron list downward to perform the same processing on all tetrahedrons contained in the volume. First, step 102 retrieves for each grid point composing the given tetrahedron, grid point data from the grid point data list. Next, step 104 finds a grid point which holds a maximum scalar value and sets up a "non-maximum" flag for all grid points other than maximum. Then, step 106 finds a grid point which holds a minimum scalar value and sets up a "non-minimum" flag for all grid points other than minimum. It is assumed that no non-maximum or non-minimum flag is set in the initial state.

In most cases, each grid point is a vertex shared by one or more adjacent tetrahedrons. Therefore, the case frequently occurs in which a grid point is maximum (or minimum) in one tetrahedron while it is not maximum (or minimum) in another tetrahedron. That is to say, the true extremal point may not be obtained by comparison in relative magnitude of scalar values in one tetrahedron alone. Accordingly, step 110, upon exit from the closed loop, regards, as extremal points, only grid points for which only either a "non-maximum" or "non-minimum" flag is set up (that is, a point once judged to be not maximum nor minimum is judged to be not an extremal point). Then, each of the grid points extracted as extremal points is given an extremal point identifier (EPID) and a new entry is established in the extremal point data list in an extremal point data storage device.

(3) Extremal point data storage device (13)/extremal point data list

The structure of an extremal point data list used in this embodiment is shown in FIG. 11. In the list, one entry is established for each extremal point identifier (EPID) and each entry has fields to store the corresponding grid point identifier (GID) and connection flag values. The function of the connection flag values is described below.

(4) Extremal point graph creation subsystem (14)

The extremal point graph creation subsystem (14) sequentially extracts lines connecting extremal points based upon information stored in the extremal point data list, for each of such lines, calculates information necessary to generate an isosurface, and stores the information in the extremal point graph data storage device (15) (the structure of extremal point graph data storage device is described below). As shown in FIG. 13, the information may include GIDs of both end points of the line, tetrahedron identifiers (PID) of tetrahedrons through which the line passes (that is, intersected tetrahedrons), and the maximum and minimum scalar values possessed by grid points composing intersected tetrahedrons through which the line passes (that is, all grid points related to the line). For example, in the case of volume data from which three extremal points ep1, ep2, and ep3 are extracted as shown in FIG. 10 (a), two lines, for example, connecting ep1 and ep2, and ep2 and ep3, will be extracted as shown in FIG. 10 (b), and the necessary information derived and then stored for each line.

The algorithm executed by this extremal point graph creation subsystem (14) is shown in FIGS. 3 to 6. The algorithm starts at step 200.

Step 202 first temporarily substitutes, for connection flags in entries in the extremal point data list, GIDs of the corresponding extremal points (refer to FIG. 11 (a)). The connection flag indicates that two extremal points are connected by a line when both flag values for the points are equal. Substituting, for each flag, the GID of the corresponding grid point (that is, giving each entry a specific connection flag value) at the start can set up a state in which no connection relation is yet established in that list.

The closed loop composed of steps 204 to 244 sequentially connects extremal points enumerated in the extremal point data list, and the same processing is repeatedly executed from the top entry in the list downward.

Step 206 retrieves (or reads out) the top of the unprocessed entries from the extremal point data list as the starting point for connection. Step 208 extracts, among other unprocessed entries, all entries whose connection flag value does not match the connection flag value of the starting point and places them in an "ending point candidate list" (not shown). Step 210 then rearranges entries in the ending point candidate list in ascending order of distance from the starting point. Calculation of the distance between grid points is obvious because their coordinates can be read, based on their GIDs, from the grid point data list. For the rearrangement of entries, a well-known array-ordering method may be used.

Step 212 prescribes termination conditions for the closed loop formed by the linkage (or 'cooperation') with decision-making step 224 described below. The closed loop is a procedure to sequentially connect with lines extremal points in the above-stated extremal point data list and extract and store tetrahedrons through which these lines pass. The detailed action of step 212 is, however, described together with the description of step 224.

Step 214 selects, as the ending point of a connection, the extremal point for the top of unprocessed entries in the ending point candidate list. Next, step 216 derives a geometrical graphic equation for the line connecting the starting point and the ending point (called a connecting line hereafter). The graphic equation can be derived from the following formula (I):

$$\frac{(x - SPx)}{(EPx - SPx)} = \frac{(y - SPy)}{(EPy - SPy)} = \frac{(z - SPz)}{(EPz - SPz)} \quad (I)$$

wherein the starting and ending point coordinates (SPx, SPy, SPz) and (EPx, EPy, EPz), respectively, are read from the grid point data list based upon their GIDs. The formula (I) is well known in the area of geometry.

Step 218 then extracts, based upon the tetrahedron list, all tetrahedrons which have the starting point at any of their vertices, and determines whether each of the tetrahedrons is intersected by the connecting line represented by the formula (I). The methods to determine whether or not a solid body contains a point on a line are themselves obvious in geometry. That a tetrahedron contains a point on a line is equivalent to having the line intersect (pass through) the tetrahedron.

Each connecting line sequentially extracted in the closed loop is given a connecting line identifier (CLID) and assigned one entry in the intersected tetrahedron list (described below in detail) in extremal point graph data storage (15). Step 220 stores PIDs of tetrahedrons, newly judged to be intersected by a connecting line, in corresponding entries in the intersected tetrahedron list.

In a similar manner, as shown in FIG. 13, each connecting line is also assigned one entry in the extremal point graph data list (described below in detail) in the extremal point graph data storage device (15). The entry has fields to store maximum (maximum scalar value: Smax) and minimum (minimum scalar value: Smin) scalar values held by grid points composing tetrahedrons through which the connecting line passes (namely, all grid points related to the connecting line). Step 220 above also compares the currently stored Smax and Smin to all scalar values held by grid points composing tetrahedrons newly judged to be intersected by the connecting line and updates Smax and Smin accordingly.

Next, step 222 reads from the tetrahedron list the PIDs of the tetrahedron adjacent to the tetrahedron currently processed (extracted in step 218), and step 224 determines whether or not any of these tetrahedrons is intersected by the connecting line. If no adjacent tetrahedrons are intersected by the connecting line, this indicates that the connecting line runs outside the object domain of volume data, and control returns to step 212 through route C.

Then, step 212 determines whether all extremal points have been selected in the ending point candidate list. That is, whether the extremal point currently processed is the last one in the ending point candidate list. If step 212 answers "Yes," this means that, for any extremal point selected from the ending point candidate list, the connecting line will run out of the domain of volume data as shown in FIG. 12 (a). In this case, it is necessary to perform special processing using the algorithm shown in FIG. 6, which is described later. If the answer is "No," however, step 214 again selects the next entry from the ending point candidate list, and processing by steps 216 to 224 are repeated.

If step 224 finds, among adjacent tetrahedrons, the presence of at least one tetrahedron intersected by the connection line, control goes to step 226 which determines whether or not the adjacent tetrahedron contains, as its vertex, the ending point selected in step 214. If step 226 answers "No," this implies that the adjacent tetrahedron intersects the connecting line and is situated midway on the connecting line; thus, control returns through route D to step 220 which updates Smax and Smin and identifies the next adjacent tetrahedron. However, if step 226 answers "Yes", this indicates that all intersected tetrahedrons on the connecting line have been extracted, and control goes to step 240 through route E.

Step 240 stores GIDs of grid points identified as starting and ending points, or as both end point IDs, in fields of the appropriate entry in the extremal point graph data list depicted in FIG. 13. Then, step 42 compares, in magnitude, connection flag values of respective extremal points identified as starting and ending points in the extremal point data list. Step 244 substitutes the smaller connection flag value for connection flags of all entries having the larger connection flag value. A description of the isosurface generation subsystem (16) below will indicate that extremal points having the same connection flag value are connected by the same connecting line and that information has already been extracted about intersected tetrahedrons on the connecting line, however, its details will be described below.

Then, control returns to step 204 through route G. Step 204 determines again whether or not all extremal points have been processed in the extremal point data list and, if the answer is "Yes," the algorithm ends at step 246; if "No," the same processing is repeated.

Figure 6:
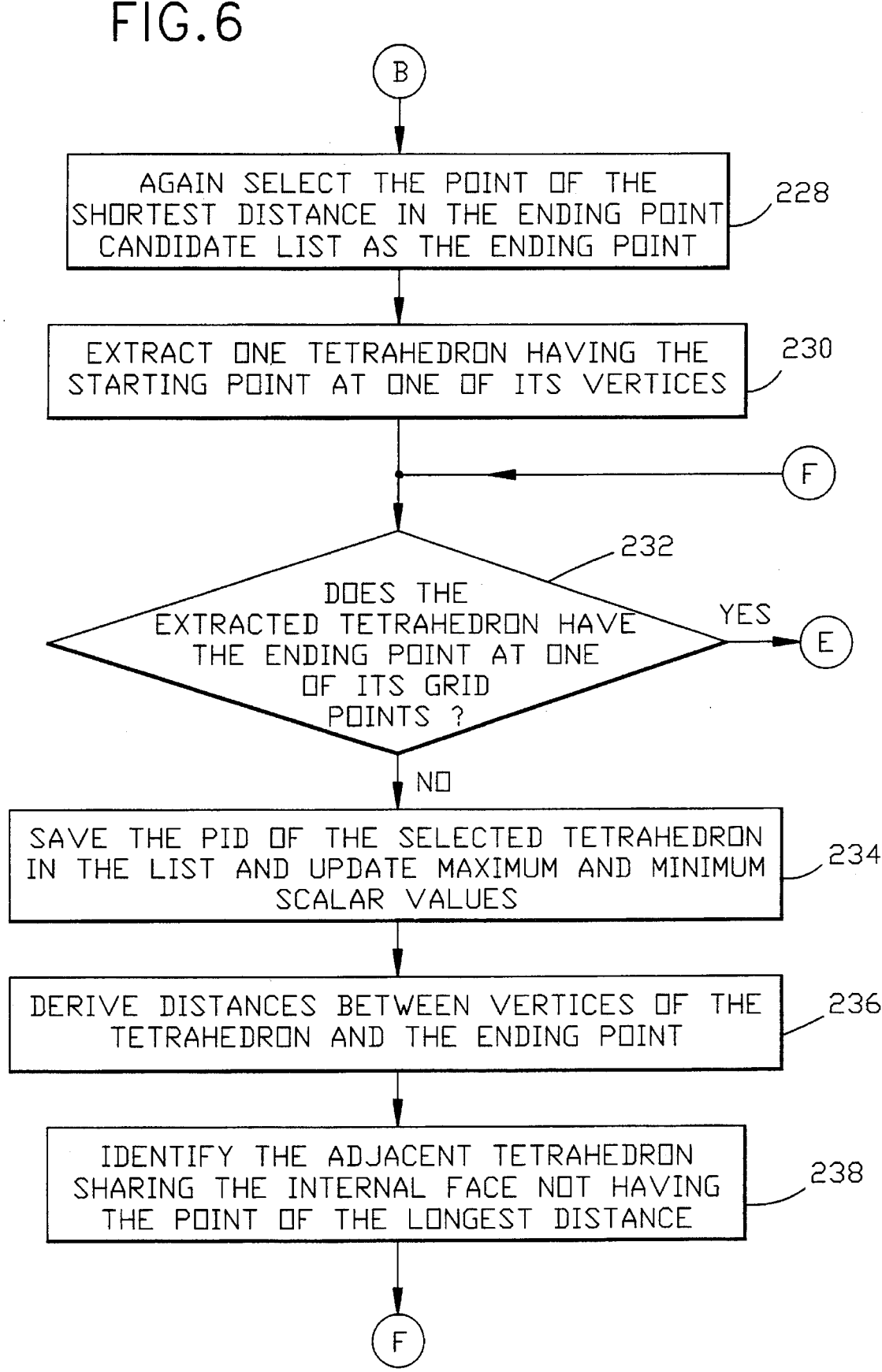
FIG. 6 is a flow chart showing still another part of the algorithm executed by the extremal point graph creation subsystem (14) of the visualized data generation system (100) according to this invention.

Described here is the processing performed if the condition of step 212 is evaluated "Yes." In this case, control goes, through route B to the algorithm shown in FIG. 6. Step 228 selects, from the ending point candidate list, the grid point having the least distance from the starting point as the ending point. Next, step 230 extracts a tetrahedron having the starting point as a vertex. Step 232 then determines whether or not the tetrahedron has the ending point at one of its vertices. If step 232 answers "Yes," control returns, through route E. However, if step 232 answers "No," step 234 enters the PID of the tetrahedron to the appropriate entry in the extremal point graph data list and updates Smax and Smin (in the same manner as step 220). Then, step 236 derives distances between vertices of the tetrahedron and the ending point, and step 238 identifies an internal face (i.e., a face that excludes the vertex which is furthest from the ending point) of the tetrahedron. Based upon the tetrahedron data list, an adjacent tetrahedron which shares the internal face is identified. If no such internal face can be identified, the same processing is executed for an internal face that excludes the vertex which is next furthest from the ending point. Control then returns through route F to step 232 which determines, based on the tetrahedron data list, whether or not the identified adjacent tetrahedron has the ending point at one of its vertices. If judged to have this end point, control returns to regular processing through route E. By executing the exceptional processing shown in FIG. 6 as discussed above, it becomes possible to construct an extremal point graph data list.

(5) Extremal point graph data storage device (15)/extremal point graph data list As stated above, the extremal point graph data storage device (15) of this embodiment contains an extremal point graph data list. The structure of the list is shown in FIG. 13.

In the extremal point graph data list, one entry is provided for each connecting line extracted by the extremal point graph creation subsystem (14). Each entry has fields to store GIDs of grid points being at both ends of the corresponding connecting line, the maximum, Smax, and the minimum, Smin, of scalar values at grid points related to the connecting line, PIDs of all intersected tetrahedrons through which the connecting line passes, and the number of intersected tetrahedrons.

(6) Isosurface generation subsystem (16)

The isosurface generation subsystem (16) is a component that extracts, based on information about connecting lines stored in the extremal point graph data list, information about tetrahedrons lying on a line connecting extremal points and information necessary for graphic display of a desired isosurface in a self-proliferating manner. Such information is extracted by identifying tetrahedrons intersecting the desired isosurface. For example, if information about lines connecting ep1 and ep2, and ep2 and ep3 denoted by dashed lines in FIG. 10 (b) is stored in the extremal point graph data list, the information necessary for graphic display may be obtained by scanning along lines as denoted by arrows in FIG. 10(c).

Figure 7:
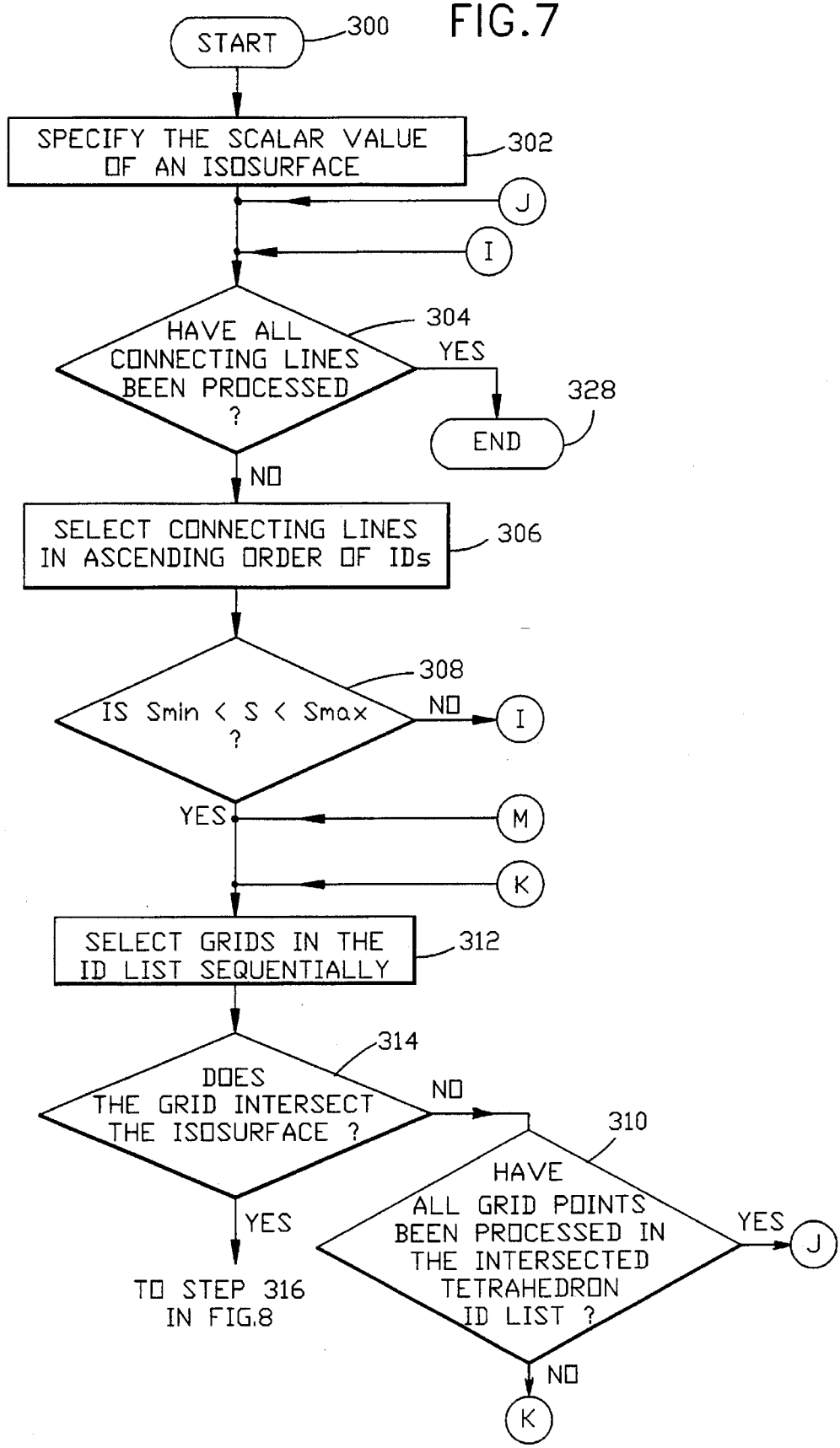
FIG. 7 is a flow chart showing part of the algorithm executed by the isosurface generation subsystem (16) of the visualized data generation system (100) according to this invention.

The algorithm executed by the isosurface creation subsystem (16) is shown in FIGS. 7 and 8. The algorithm starts at step 300, but waits for processing until a scalar value is inputted by the user.

In step 302, the user specifies the scalar value S held by the designated isosurface (DS) through operations such as the entry of numerical values from a keyboard (21) or selection by a mouse (22) from menus on a display unit (23). If the system is designed so as to automatically identify different multiple scalar values for successive display of isosurfaces, the user may specify an arbitrary position in the volume using the mouse (22) or another coordinate pointing means and the system will then identify the scalar value at the position.

Step 306 sequentially selects an unprocessed entry from the extremal point graph data list, and step 308 compares, in magnitude, the maximum scalar value, Smax, and the minimum scalar value, Smin, held by the connecting line of the entry with specified scalar value S. If Smax<S or Smin>S, then it is obvious that the connecting line does not intersect the isosurface DS, and processing returns to step 304 through route I. Control then proceeds toward step 328, and ends the algorithm if the connecting line is the last entry in the extremal point graph data list. If the line is not the last entry of the list, the same processing is repeated on the next unprocessed entry.

If, however, step 308 decides that Smin<S<Smax, then the connecting line intersects the isosurface DS and control proceeds to step 312.

Step 312 sequentially selects PIDs of intersected tetrahedrons stored in the entry, and step 314 determines whether or not the selected tetrahedron intersects the isosurface DS. Here, whether or not a polyhedron intersects an isosurface can be easily determined based on whether or not the scalar value of the isosurface lies between the maximum and minimum of scalar values at vertices composing the tetrahedron. If step 314 answers "No," namely, the tetrahedron does not intersect the isosurface, control returns to step 310. Step 310 determines whether or not a given tetrahedron is the last one in the intersected tetrahedron field of the entry and, if the answer is "Yes," control returns to step 304 through route J and the same processing as above is repeated. If step 310 answers "No," unprocessed tetrahedrons remain in the intersected tetrahedron field, and control proceeds to step 312 through route k for the next tetrahedron.

If, however, step 314 answers "Yes," the isosurface intersects the tetrahedron and control proceeds to steps 316 through 326 to generate isosurfaces in a self-proliferating manner.

Step 316 places PIDs of tetrahedrons judged to intersect the isosurface on the queue list (not shown) provided in the system (100). Next, step 318 sequentially selects tetrahedrons in the queue, starting from the top backward. Step 320 calculates sectional polygons formed by cutting tetrahedrons with the isosurface and divides these polygons into one or more triangles and gives each such triangle a triangle identifier (TID). For each TID, one entry is provided in the triangle data list of the isosurface data storage device (17), and the GIDs of vertices composing such triangles is stored in the entry (see FIG. 14). Here, the sectional polygon formed by cutting a tetrahedron with the isosurface can be easily defined by deriving points of intersection of the edges of the tetrahedron with the isosurface. An intersection will occur if the scalar value of the isosurface is in between the scalar values at both ends of that edge. Such intersection points are determined by linear algebraic calculation. The sectional polygons are formed by connecting the intersection points.

Step 322 extracts from the tetrahedron list those tetrahedrons sharing a face on which the line of intersection with the isosurface runs, and places them in the above queue.

Step 324 determines whether or not the above queue is empty and, if it is not, control returns to step 318 through route L and the above processing is repeated.

If, however, step 324 answers "Yes," the above queue is empty, step 326 gives each vertex stored in the triangle data list a vertex identifier (VID) and reads scalar values, coordinates, and other necessary information from the grid point data list and stores them in fields of the appropriate entry in the vertex data list (the vertex data list has one entry for each vertex, detailed below) in the isosurface data storage device (17). On completion of processing by step 326, control returns to step 310 through route M and goes to processing of the next entry in the extremal point graph data list.

(7) Isosurface data storage device (17)/triangle data list and vertex data list

The isosurface data storage device (17) contains, as described above, triangle and vertex data lists. The structure of the triangle data list is shown in FIG. 14 (a) and that of the vertex data list is shown in FIGS. 14(b).

The triangle data list provides one entry for each triangle extracted by the isosurface generation subsystem (16), and each entry has respective fields to store the TID of the corresponding triangle and GIDs of vertices composing that triangle.

Similarly, the vertex data list provides one entry for each vertex extracted by the isosurface generation subsystem (16), and each entry has respective fields to store the VID of the corresponding vertex and the coordinates and scalar value of that vertex.

(8) Graphic processing subsystem (18)

The graphic processing subsystem (18) is a component that converts logical graphic information stored in the isosurface data storage device (17) to physical graphic information for actual representation on a display unit (23), and can be well implemented using existing technology.

The system (100) can represent three-dimensional scalar data in the following two forms:

(1) Represents an isothermal or isopiestic surface as a curved surface by using scalar values of temperature or pressure obtained as a result of measurement or numerical analysis (refer to FIG. 15 (a));

(2) Represents scalar data on a slice surface as a plane by using the function value derived from coordinates of a grid point instead of the scalar value at that grid point. In this case, the slice surface may be displayed in color by calculating the scalar value (temperature, pressure or the like) at each vertex on the slice surface and using the color representing the scalar value at each position (refer to FIG. 15 (b)).

This system (100) will, at that point in time when entering three-dimensional scalar data and storing it in volume data storage (11), also generate extremal point data and extremal point graph data together and store it in the respective storage (13) and (15). Once data is stored, the system (100) waits for the user to specify an isosurface.

With this system, the user can specify the scalar value of an isosurface in any one of the three ways below:

(1) Direct entry of numerical values from a keyboard;

(2) Selecting, by a mouse, menu items such as "greater than" and "less than" provided in the system (100); or (3) Selecting, by a mouse, the menu item "successive display" provided in the system (100). In this case, the system (100) automatically identifies a scalar value and generates an isosurface and, by repeating the same processing, displays isosurfaces successively.

In the case of display of an isothermal, isopiestic, or other isosurface, a numerical value for temperature pressure, and the like can be directly entered in units of the unit system of scalar values given at grid points. In displaying a slice surface perpendicular to either the x-, y- or z-axis, the user can directly enter a coordinate on that coordinate axis. For a slice surface not perpendicular to any of the x-, y- and z-axes, the user still can manipulate it by intuition by directly entering multiple parameters or using means (2) or (3) above.

Once a scalar value is specified, connecting lines are sequentially selected in extremal point graph data. Processing is omitted for connecting lines which do not obviously intersect the isosurface, and the next connecting line is selected. For the entry for the selected connecting line, tetrahedrons are sequentially selected from the field which contains PIDs of intersected tetrahedrons, and whether or not they intersect with the isosurface is determined. On tetrahedrons intersecting with the isosurface, self-proliferating isosurface generation according to this invention is executed. GIDs of tetrahedrons judged to intersect with the isosurface are placed in a queue. Tetrahedrons are sequentially read from the queue, starting from the top, polygons formed by the intersection of polyhedrons with the isosurface are divided into a set of triangles, vertices of each triangle are given vertex identifiers (VID), and these are then stored in the triangle data list. At the same time, an internal face intersecting the isosurface is identified, and adjacent tetrahedrons sharing this internal face are also identified referring to the tetrahedron data list and placed in the above-mentioned queue. After repeating processing until this queue is empty, coordinates of vertices of generated triangles are derived, then stored in the vertex data list. The processing above is executed for all tetrahedrons stored as intersected tetrahedrons. At that point in time when all connecting lines of extremal point graph data have been selected, isosurface data is complete.

Tetrahedrons treated in the processing above are only those stored as intersected tetrahedrons in extremal point graph data and those actually intersecting the isosurface. Usually, these tetrahedrons are merely a part of all volume data. Therefore, compared to existing techniques which involve determining the intersecting relationship of every tetrahedron, it may be understood that isosurface data can be generated by far more efficiently.

All isosurface data is transferred to the graphic processing subsystem (18), which provides a table (not shown) to indicate the relationship between a scalar value and the corresponding color. Transferred isosurface data is represented on display unit (23) in one of the forms below.

In the case of an isothermal or isopiestic surface or other isosurface:

(1) displays each triangle painted in the color corresponding to its scalar value (temperature, pressure, and the like); or (2) displays each triangle with its sides colored corresponding to its scalar value (temperature, pressure, and the like).

In the case of a slice surface:

(1) displays each triangle painted in the color corresponding to its scalar value (temperature, pressure, and the like); or (2) displays isothermal or isopiestic lines or other isolines in colors corresponding to scalar values (temperature, pressure, and the like) on a slice surface.

As detailed above, with the visualized data generation method and device according to this invention, isosurfaces for visualizing volume data can be generated at high speed. In addition, it is possible to automatically generate, without problems to the user, the designated isosurfaces. Moreover, the invention allows an animated display of isosurfaces without relying on saving to memory area and successive interactive generation of isosurfaces.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for generating an isosurface constituting grid points having a predetermined scalar value from volume data stored in a first memory, said volume data consisting of multiple polyhedrons composed of a plurality of grid points each having an associated scalar value, the method comprising the steps of:

(a) extracting from said first memory a first grid point having a maximum scalar value with respect to said scalar values of said plurality of grid points of said multiple polyhedrons;

(b) extracting from said first memory a second grid point having a minimum scalar value with respect to said scalar values of said plurality of grid points of said multiple polyhedrons;

(c) generating and storing in a second memory a list of polyhedrons that intersect a line connecting said first grid point extracted in step (a) to said second grid point extracted in step (b); and (d) generating said isosurface according to said list of polyhedrons stored in said second memory and said predetermined scalar value.

2. The method of claim 1, wherein step (a) extracts from said first memory a plurality of grid points having said maximum scalar value;

step (b) extracts from said first memory a plurality of grid points having said minimum scalar value; and step (c) generates a plurality of lines each connecting one of said plurality of gridpoints extracted in step/a/to one of said plurality of grid points extracted in step (b), and generates and stores in said second memory a list of polyhedrons that intersect each of said plurality of lines.

3. The method of claim 1, wherein step (c) comprises the step of determining whether said line runs outside of said volume data.

4. The method of claim 1, further comprising the step of:

(e) generating and storing in a third memory a list of polyhedrons within said volume data that connect said first grid point extracted in step (a) to said second grid point extracted in step (b);

and wherein step (d) generates said isosurface according to said list of polyhedrons stored in said third memory.

5. The method of claim 1, wherein said predetermined scalar value is input by a user.

6. The method of claim 1, wherein said volume data includes polyhedron identifiers corresponding to each of said polyhedrons and grid point identifiers corresponding to each of said grid points.

7. The method of claim 6, wherein step (a) extracts from said volume data a first grid point identifier corresponding to said first grid point.

8. The method of claim 6, wherein step (b) extracts from said volume data a first grid point identifier corresponding to said second grid point.

9. The method of claim 6, wherein step (c) generates and stores polyhedron identifiers corresponding to each of said polyhedrons of said list.

10. An apparatus for generating an isosurface constituting grid points having a predetermined scalar value from volume data stored in a first memory, said volume data consisting of multiple polyhedrons composed of a plurality of grid points each having an associated scalar value, said apparatus comprising:

a first extractor for extracting from said first memory a first grid point having a maximum scalar value with respect to said scalar values of said plurality of grid points of said multiple polyhedrons;

a second extractor for extracting from said first memory a second grid point having a minimum scalar value with respect to said scalar values of said plurality of grid points of said multiple polyhedrons;

a polyhedron list generator for generating a list of polyhedrons that intersect a line connecting said first grid point to said second grid point;

a second memory for storing said list generated by said polyhedron list generator; and an isosurface generator for generating said isosurface according to said list of polyhedrons stored in said second memory and said predetermined scalar value.

11. The apparatus of claim 10, wherein said first extractor extracts a plurality of grid points having said maximum scalar value;

said second extractor extracts a plurality of grid points having said minimum scalar value; and said polyhedron list generator generates a plurality of lines each connecting one of said plurality of grid points extracted in step (a) to one of said plurality of grid points extracted in step (b), and generates a list of polyhedrons that intersect each of said plurality of lines.

12. The apparatus of claim 10, wherein said polyhedron list generator determines whether said line runs outside of said volume data.

13. The apparatus of claim 10, further comprising:

a second polyhedron list generator for generating a second list of polyhedrons within said volume data that connect said first grid point to said second grid point; and a third memory for storing said second list;

and wherein said isosurface generator generates said isosurface according to said second list stored in said third memory.

14. The apparatus of claim 10, wherein said predetermined scalar value is input by a user.

15. The apparatus of claim 10, wherein said volume data includes polyhedron identifiers corresponding to each of said polyhedrons and grid point identifiers corresponding to each of said grid points.

16. The apparatus of claim 16, wherein said first extractor extracts from said volume data a first grid point identifier corresponding to said first grid point.

17. The apparatus of claim 15, wherein said second extractor extracts from said volume data a first grid point identifier corresponding to said second grid point.

18. The apparatus of claim 15, wherein said list generated by said polyhedron list generator includes polyhedron identifiers corresponding to each of said polyhedrons that intersect said line.

* * * * *